(12) United States Patent  (10) Patent No.: US 7,364,370 B2
Nishizawa et al.  (45) Date of Patent: Apr. 29, 2008

(54) OPTICAL RECEPTACLE AND OPTICAL MODULE WITH OPTICAL RECEPTACLE

(75) Inventors: Toshiki Nishizawa, Tokyo (JP); Kenji Kobayashi, Tokyo (JP)

(73) Assignee: NTT Electronics Corporation, Tokyo (JP)

( * ) Notice: Subject to any disclaimer, the term of this patent is extended or adjusted under 35 U.S.C. 154(b) by 0 days.

(21) Appl. No.: 11/466,025

(22) Filed: Aug. 21, 2006

(65) Prior Publication Data

US 2007/0053638 A1 Mar. 8, 2007

(30) Foreign Application Priority Data

Sep. 2, 2005 (JP) ............................. 2005-255516

(51) Int. Cl.
    *G02B 6/36* (2006.01)
(52) U.S. Cl. .............................. 385/92; 385/88; 385/93
(58) Field of Classification Search ................... 385/88, 385/89, 90, 91, 92, 93, 94
    See application file for complete search history.

(56) References Cited

U.S. PATENT DOCUMENTS 7,217,042 B2 * 5/2007 Okada et al. ................. 385/93
7,244,069 B2 * 7/2007 Nakanishi et al. ............. 385/93
2004/0146252 A1 * 7/2004 Healy et al. .................. 385/88
2005/0207710 A1 * 9/2005 Tanaka et al. ................ 385/78

FOREIGN PATENT DOCUMENTS

JP 2004-093696 3/2004

* cited by examiner

*Primary Examiner*—Tina M. Wong
*Assistant Examiner*—John M Bedtelyon
(74) *Attorney, Agent, or Firm*—Hogan & Haratson LLP

(57) ABSTRACT

An optical receptacle according to the invention includes a columnar stub ferrule having an optical fiber inserted into a center line connecting both opposite end faces; a cylindrical sleeve into which a part of the stub ferrule is inserted; and a housing in which a through hole is formed, which houses the stub ferrule and the sleeve in the through hole, which holds a part on a side on which the stub ferrule is not inserted into the sleeve, with a projecting portion formed in the through hole, and which surrounds a side surface of the stub ferrule on the side on which the stub ferrule is not inserted into the sleeve. The optical receptacle has a space between the side surface of the stub ferrule on the side on which the stub ferrule is not inserted into the sleeve and an inner peripheral surface of the housing opposing the side surface.

3 Claims, 4 Drawing Sheets

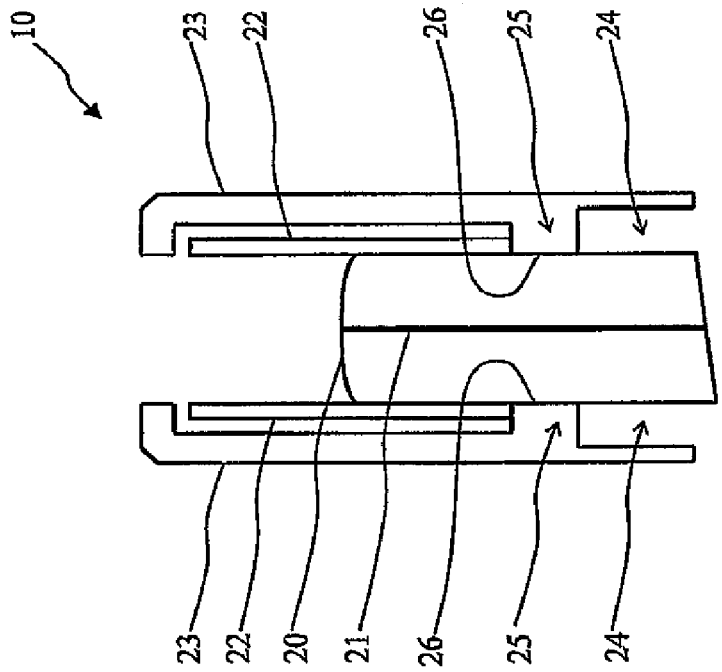
Fig. 1A
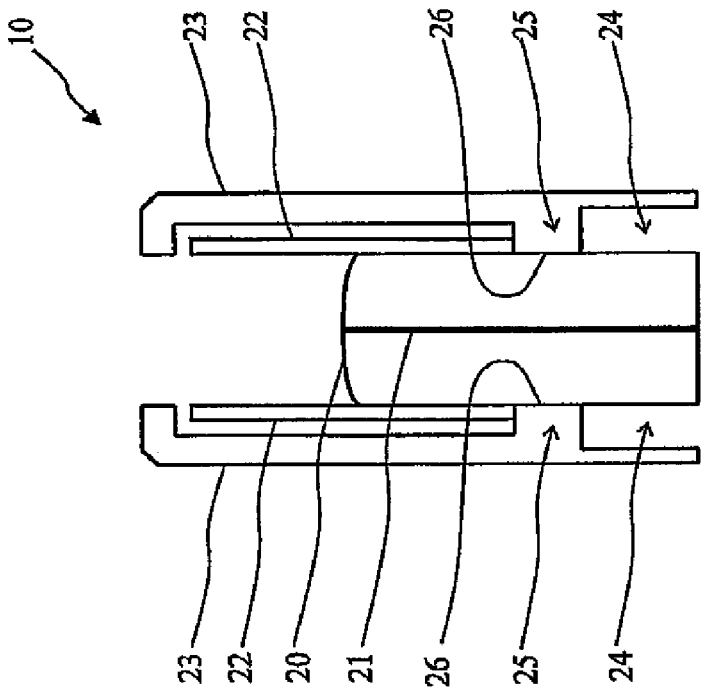
Fig. 1B
Fig. 1

OPTICAL RECEPTACLE AND OPTICAL MODULE WITH OPTICAL RECEPTACLE

The present application is based on, and claims priority from, J.P. Application 2005-255516, filed Sep. 2, 2005, the disclosure of which is hereby incorporated by reference herein in its entirety.

BACKGROUND OF THE INVENTION

1. Field of the Invention

The present invention relates an optical receptacle in which an optical connector is connected to an optical semiconductor device such as a light emitting diode or a photodiode and a module with the optical receptacle.

2. Description of the Related Art

Since a conventional optical module using an optical receptacle is good in versatility and is easy to handle, the degree of importance of the optical module gradually increases, and the optical module is requested to be further reduced in size.

A conventional optical module with optical receptacle will be described below by using an optical module with optical receptacle 90 disclosed in Japanese Patent Application Laid-open No. 2004-93696 as an example with reference to FIG. 4. FIG. 4 is a sectional view of the optical module with optical receptacle 90. The optical module with optical receptacle 90 includes a stub ferrule 20, an optical fiber 21, a sleeve 22, a housing 23, an optical module 40, a stub holder 91, and a holder 92.

The optical fiber 21 is inserted into a center line connecting both opposite end faces in the stub ferrule 20, and the stub ferrule 20 is held by the stub holder 91. A part of the stub holder 91 is inserted into the sleeve 22. The housing 23 is arranged so as to cover the sleeve 22. The holder 92 holds the sleeve 22, the housing 23, and the stub holder 91.

An end face of a ferrule inserted into the sleeve 22 from the outside (hereinafter, "a ferrule inserted into the sleeve 22 from the outside" is referred to as "an external ferrule") and an end face of the stub ferrule 20 are in tight contact with each other. Therefore, the optical module with optical receptacle 90 can reduce a connection loss. Since the optical module with optical receptacle 90 is constructed by using the stub holder 91 and the holder 92, the optical fiber 21 can be reduced in length in an optical-axis direction and can be reduced in size.

However, in the optical module with optical receptacle 90, the holder 92 must be made larger than the optical module 40 in order to hold an outer peripheral portion of the optical module 40 with the holder 92. Therefore, the optical module with optical receptacle 90 disadvantageously increases in size. When the optical module with optical receptacle 90 increases in size, the optical module with optical receptacle 90 is difficult to be mounted on a compact optical transceiver or the like.

SUMMARY OF THE INVENTION

The present invention has been made to solve the above problem, and its object is to provide an optical receptacle which has a small connection loss and by which an optical module can be reduced in size and an optical module with optical receptacle reduced in size. In addition, it is another object to provide an optical module with an optical receptacle the optical axis of which is can be easily adjusted.

In order to achieve the above object, the first aspect of the present application is an optical receptacle having a space between a side surface of a stub ferrule which is not inserted into a sleeve and an inner peripheral surface of a housing.

More specifically, the first aspect of the present application is an optical receptacle including: a columnar stub ferrule having an optical fiber inserted into a center line connecting both opposite end faces; a cylindrical sleeve into which a part of the stub ferrule is inserted; and a housing in which a through hole is formed, which houses the stub ferrule and the sleeve in the through hole, which holds a part on a side on which the stub ferrule is not inserted into the sleeve, with a projecting portion formed in the through hole, and which surrounds a side surface of the stub ferrule on the side on which the stub ferrule is not inserted into the sleeve, wherein the optical receptacle has a space between the side surface of the stub ferrule on the side on which the stub ferrule is not inserted into the sleeve and an inner peripheral surface of the housing opposing the side surface.

When external ferrule is inserted into the sleeve, the optical receptacle can reduce a shift in optical axis. The optical module is arranged through the space held between the stub ferrule and the housing, the optical receptacle can reduce the case of the optical module in size.

Therefore, the first aspect of the present application can provide an optical receptacle which has a small connection loss and by which the optical module can be reduced in size.

In order to achieve the above object, a second aspect of the present application is an optical module with optical receptacle including an optical receptacle according to the first aspect of the present application, a cylindrical optical receptacle holding sleeve fitted on an inner peripheral surface of the housing, and an optical module.

More specifically, the second aspect of the present application is an optical module with optical receptacle including: an optical receptacle having a columnar stub ferrule having an optical fiber inserted into a center line connecting both opposite end faces, a cylindrical sleeve into which a part of the stub ferrule is inserted, and a housing in which a through hole is formed, which houses the stub ferrule and the sleeve in the through hole, which holds a part on a side on which the stub ferrule is not inserted into the sleeve, with a projecting portion formed in the through hole, and which surrounds a side surface of the stub ferrule on the side on which the stub ferrule is not inserted into the sleeve, and having a space between the side surface of the stub ferrule on the side on which the stub ferrule is not inserted into the sleeve and an inner peripheral surface of the housing opposing the side surface; a cylindrical optical receptacle holding sleeve matched to the space of the housing and fitted on the inner peripheral surface of the housing; and an optical module on which the optical receptacle holding sleeve is arranged and which has a case having an opening formed on an optical axis of the optical fiber and an optical semiconductor device housed in the case so as to form an optical path between the optical semiconductor device and the optical fiber.

When the external ferrule is inserted into the sleeve, the optical module with optical receptacle can reduce a shift in optical axis. Since the optical module is arranged on the optical receptacle through the space between the stub ferrule and the housing, the optical module can reduce the case of the optical module in size.

Therefore, the second aspect of the present application can provide an optical module with optical receptacle which has a small connection loss and is reduced in size.

According to the second aspect of the present application, a gap is preferably formed between the inner peripheral surface of the optical receptacle holding sleeve and an outer peripheral surface of the stub ferrule.

The gap is formed between the inner peripheral surface of the optical receptacle holding sleeve and the outer peripheral surface of the stub ferrule to prevent the optical receptacle holding sleeve from being sandwiched between the stub ferrule and the housing. Therefore, the optical receptacle can be easily attached to or detached from the optical module, and the optical module with optical receptacle can easily adjust a position of the optical fiber in an optical-axis direction.

Therefore, the second aspect of the present application can provide an optical module with optical receptacle which has a small connection loss and is reduced in size. In addition, the second aspect of the present application can provide an optical module with optical receptacle which can easily adjust an optical axis.

The present invention can provide an optical receptacle which has a small connection loss and by which an optical module can be reduced in size, and an optical module with optical receptacle reduced in size. In addition, the present invention can provide an optical module with optical receptacle which can easily adjust an optical axis.

BRIEF DESCRIPTION OF THE DRAWINGS

FIG. 1 is a sectional view of an optical receptacle according to an embodiment of the first aspect of the present application.

DESCRIPTION OF THE PREFERRED EMBODIMENTS

Figure 2:
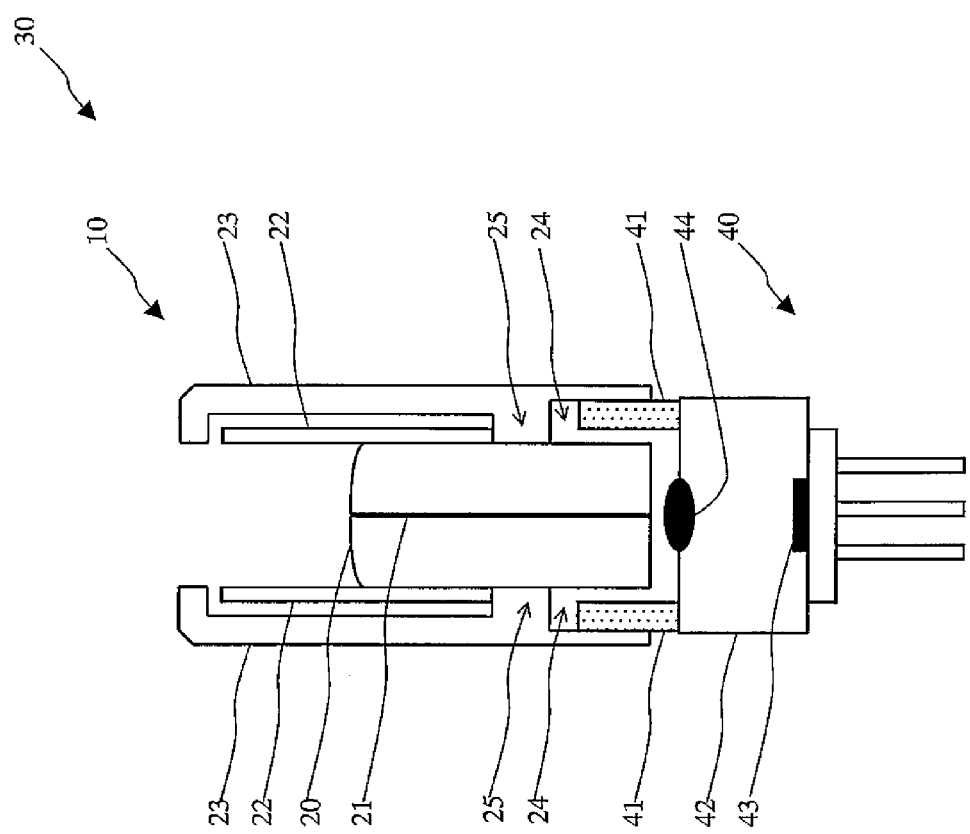
FIG. 2 is a sectional view of an optical module with optical receptacle according to an embodiment of the second aspect of the present application.

Embodiments of the present invention will be described below in detail with reference to the accompanying drawings. The present invention is not limited to the following embodiments described below.

First Embodiment

A first embodiment of the present application is an optical receptacle including a columnar stub ferrule having an optical fiber inserted into a center line connecting both opposite end faces; a cylindrical sleeve into which a part of the stub ferrule is inserted; and a housing in which a through hole is formed, which houses the stub ferrule and the sleeve in the through hole, which holds a part on a side on which the stub ferrule is not inserted into the sleeve, with a projecting portion formed in the through hole, and which surrounds a side surface of the stub ferrule on the side on which the stub ferrule is not inserted into the sleeve. The optical receptacle has a space between the side surface of the stub ferrule on the side on which the stub ferrule is not inserted into the sleeve and an inner peripheral surface of the housing opposing the side surface.

An optical receptacle 10 according to the first embodiment will be described below with reference to FIG. 1. FIG. 1 is a sectional view of the optical receptacle 10. The optical receptacle 10 includes a stub ferrule 20, an optical fiber 21, a sleeve 22, a housing 23, a space 24, and a projecting portion 25.

Manufacturing of the optical receptacle 10 will be described first. The stub ferrule 20 has a columnar shape. The optical fiber 21 is inserted into a center line connecting both opposing end faces of the stub ferrule 20. For example, as a material of the stub ferrule 20, zirconia, alumina, other ceramics, or hardened plastic is included. For example, as the optical fiber 21, a single-mode glass fiber is included.

As shown in FIG. 1A, an end face of the stub ferrule 20 on the space 24 side may be ground to be perpendicular to the optical axis of the optical fiber 21. As shown in FIG. 1B, the end face may be ground to incline within a range of 4 deg or more to 8 deg or less with respect to a vertical line of the optical axis of the optical fiber 21.

An end face of the stub ferrule 20 on the sleeve 22 side may be spherically ground to achieve Physical Contact (PC) connection.

A part of the stub ferrule 20 is inserted into the sleeve 22. For example, as the sleeve 22, a cylindrical slit sleeve having zirconia, alumina, other ceramics, hardened plastic, or a metal, as a material, is included.

In the housing 23, a through hole is formed. The housing 23 houses the stub ferrule 20 and the sleeve 22 in the through hole. The housing 23 surrounds a side surface of the stub ferrule 20 on a side on which the stub ferrule 20 is not inserted into the sleeve 22. The space 24 is located between the side surface of the stub ferrule 20 on which the stub ferrule 20 is not inserted into the sleeve 22 and the inner peripheral surface of the housing 23 opposing the above-described side surface.

For example, as a material, the housing 23, stainless steel, aluminum, copper, or other metals is included.

The shape of the housing 23 is not limited to a specific shape. For example, as the shape of the housing 23, an SC type, an SC2 type, a D type, an FC type, an LC type, an MU type shapes adapting to other standards are included. An outer diameter of the housing 23 may be 4.74 mm when the housing 23 is of the SC type, and may be 2.92 mm when the housing 23 is of the LC type. Dimensions of the space 24 are 2.7 mm in the direction of the optical axis of the optical fiber 21 and 0.85 mm in a direction perpendicular to the optical axis of the optical fiber 21. The thickness of the housing 23 near the space 24 may be 0.3 mm. The outer diameter of the housing 23, the dimensions of the space 24, and the thickness of the housing 23 near the space 24 are not limited to the values described above.

The housing 23 may be manufactured by the following method. For example, the housing 23 is integrally formed by using a mold which can form the through hole, the space 24 between the stub ferrule 20 and the housing 23, the projecting portion 25 for holding the stub ferrule 20 in the through hole of the housing 23 in the housing 23. Furthermore, the housing 23 may be formed by using a microblast, laser processing, or high-precision metal processing.

The projecting portion 25 may be formed in the through hole of the housing 23. For example, the projecting portion 25 may be an annular body which circulates on the inner periphery of the through hole of the housing 23. The projecting portion 25 may be a plurality of projections formed on the inner periphery of the through hole of the housing 23.

The housing 23 holds a part 26 of the stub ferrule 20 on a side on which the stub ferrule 20 is not inserted into the sleeve 22, with the projecting portion 25. For example, the projecting portion 25 and the part 26 of the stub ferrule 20 on the side on which the stub ferrule 20 is not inserted into the sleeve 22 may be bonded to each other. The projecting portion 25 may be formed so as to have an inner diameter smaller than the outer diameter of the stub ferrule 20. The stub ferrule 20 may be held such that the stub ferrule 20 is press-fitted on the projecting portion 25 of the housing 23.

It will be described below that the optical receptacle 10 can reduce a connection loss and can reduce the optical module in size. When an external ferrule is inserted into the sleeve 22, an end face of the stub ferrule 20 on the sleeve 22 side and an end face of an external ferrule are PC-connected to each other because the end face of the stub ferrule 20 on the sleeve 22 side is spherically ground. The optical axis of the optical fiber 21 and the optical axis of the optical fiber formed in the external ferrule correspond to each other. Therefore, the optical receptacle 10 can reduce a connection loss.

In the optical receptacle 10, when the optical receptacle 10 is arranged through the space 24 held between the stub ferrule 20 and the housing 23, the optical receptacle 10 can reduce a case of the optical module in size.

Therefore, the first embodiment of the present application can provide an optical receptacle which has a small connection loss and can reduce the optical module in size.

Second Embodiment

A second embodiment of the present application is an optical module with optical receptacle including: an optical receptacle having a columnar stub ferrule having an optical fiber inserted into a center line connecting both opposite end faces, a cylindrical sleeve into which a part of the stub ferrule is inserted, and a housing in which a through hole is formed, which houses the stub ferrule and the sleeve in the through hole, which holds a part on a side on which the stub ferrule is not inserted into the sleeve, with a projecting portion formed in the through hole, and which surrounds a side surface of the stub ferrule on the side on which the stub ferrule is not inserted into the sleeve and having a space between the side surface of the stub ferrule on the side on which the stub ferrule is not inserted into the sleeve and an inner peripheral surface of the housing opposing the side surface; a cylindrical optical receptacle holding sleeve matched to the space of the housing and fitted on the inner peripheral surface of the housing; and an optical module on which the optical receptacle holding sleeve is arranged and which has a case having an opening formed on an optical axis of the optical fiber and an optical semiconductor device housed in the case so as to form an optical path between the optical semiconductor device and the optical fiber.

Figure 3:
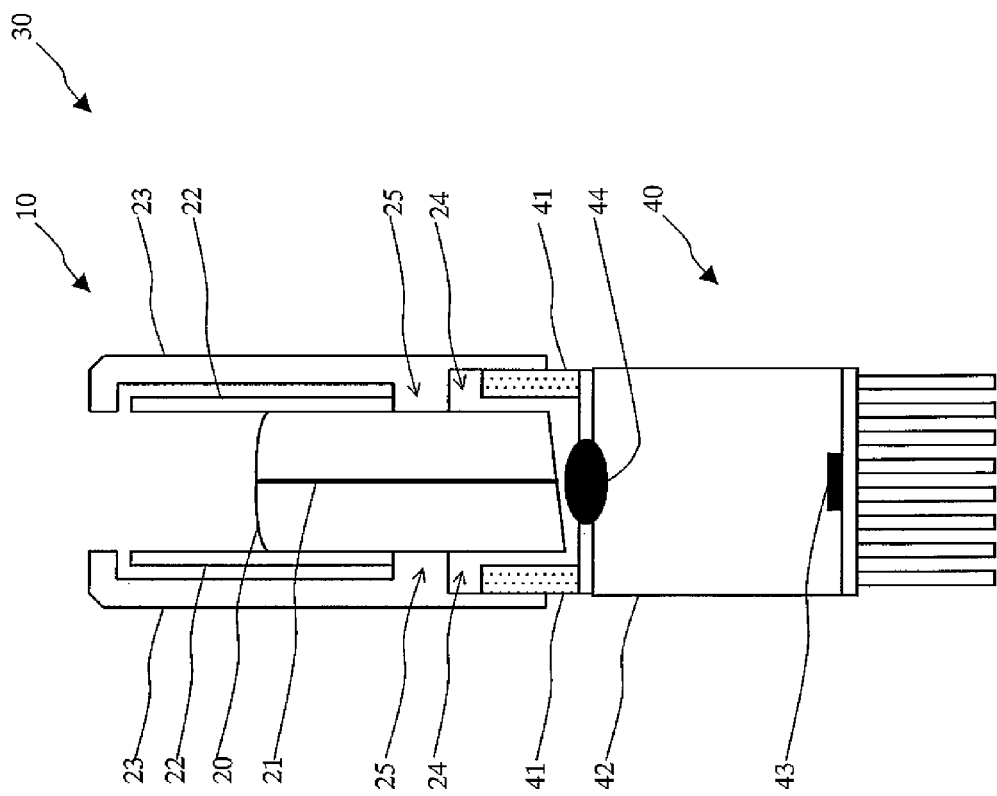
FIG. 3 is a sectional view of an optical module with optical receptacle according to another embodiment of the second aspect of the present application.

An optical module with optical receptacle 30 according to the second embodiment will be described below with reference to FIGS. 2 and 3. FIGS. 2 and 3 are sectional views of the optical module with optical receptacle 30. An optical receptacle 10 includes a stub ferrule 20, an optical fiber 21, a sleeve 22, a housing 23, a space 24, and a projecting portion 25. An optical module 40 includes an optical receptacle holding sleeve 41, a case 42, a photodiode 43, and a lens 44. When the optical receptacle 10 according to the first embodiment is arranged on the optical module 40, the optical module with optical receptacle 30 according to the second embodiment is obtained.

FIG. 2 shows a structure in which the optical receptacle 10 having an end face on the space 24 side of the stub ferrule 20 perpendicular to the optical axis of the optical fiber 21 is arranged on the optical module 40 having a small-size case 42. FIG. 3 shows a structure in which the optical receptacle 10 having an end face on the space 24 side of the stub ferrule 20 inclined with respect to a vertical line of the optical axis of the optical fiber 21 is arranged on the optical module 40 having a square case 42.

Manufacturing of the optical module 40 will be described below. The case 42 may have an arbitrary shape such as a cylindrical shape, a square-columnar shape, or a cubic shape as long as the case has a cavity inside. The opening of the case 42 may be formed at a place where a surface of the case 42 and the optical axis of the optical fiber 21 cross. For example, as a material of the case 42, stainless steel, aluminum, copper, or other metals are present.

The lens 44 is arranged at a position on an optical axis of the optical fiber 21 of the case 42. For example, the lens 44 may be arranged on the opening of the case 42. In place of the arrangement of the lens 44, a plate which is transparent to desired light may be arranged on the opening of the case 42. The opening of the case 42 may be left open.

The photodiode 43 is housed in the case 42 so as to form an optical path between the photodiode 43 and the optical fiber 21. For example, the optical module with optical receptacle 30 may provided, as an optical semiconductor device, with the photodiode 43, another light receiving device, a light emitting diode, or another light emitting device. The optical module with optical receptacle 30 may include, as optical semiconductor devices, a light receiving device and a light emitting device.

The optical receptacle holding sleeve 41 is matched with the space 24 of the optical receptacle 10 and fitted on the inner peripheral surface of the housing 23. For example, the optical receptacle holding sleeve 41 may be formed by shaping stainless, aluminum, copper, or another metal in the form of a cylindrical shape.

A method of connecting the optical receptacle 10 and the optical module 40 to each other through the optical receptacle holding sleeve 41 will be described below. The optical receptacle holding sleeve 41 is inserted into the space 24 of the housing 23. The optical receptacle 10 and the optical module 40 are positionally adjusted to each other such that the optical receptacle 10 and the optical module 40 are not shifted from each other in the direction of the optical axis. Thereafter the optical receptacle holding sleeve 41 is arranged in the housing 23.

For example, as a method of arranging the optical receptacle holding sleeve 41 in the housing 23, a laser welding using a YAG laser or a $CO_2$ laser is included. A processing point at which the YAG laser is irradiated on the outer peripheral portion of the housing 23 is determined. The YAG laser is irradiated from the processing point of the housing 23 to the optical receptacle holding sleeve 41. The processing point of the housing 23 onto which the YAG laser is irradiated is vaporized in response to heat from the YAG laser. The laser welding progresses while forming a hole at the processing point of the housing 23 until the hole reaches the optical receptacle holding sleeve 41. Since the laser welding progresses while forming the hole described above, the housing 23 and the optical receptacle holding sleeve 41 are welded by deep penetration welding.

The optical receptacle 10 and the optical module 40 are positionally adjusted to each other such that the optical receptacle 10 and the optical module 40 are not shifted from each other in a direction perpendicular to the optical axis of the optical fiber 21. Thereafter, the optical receptacle holding sleeve 41 is arranged in the case 42. For example, the optical receptacle holding sleeve 41 is welded on the case 42 by using the laser welding described above.

It will be described below that the optical module with optical receptacle 30 can reduce a connection less and can reduce the optical module 40 in size. When an external ferrule is inserted into the sleeve 22, an end face of the stub ferrule 20 on the sleeve 22 side and an end face of the external ferrule are brought into tight contact with each other because the end face of the stub ferrule 20 on the sleeve 22 side is spherically ground. The optical axis of the optical fiber 21 and the optical axis of the optical fiber formed in the external ferrule correspond to each other. Therefore, the optical module with optical receptacle 30 can reduce a connection loss.

Figure 4:
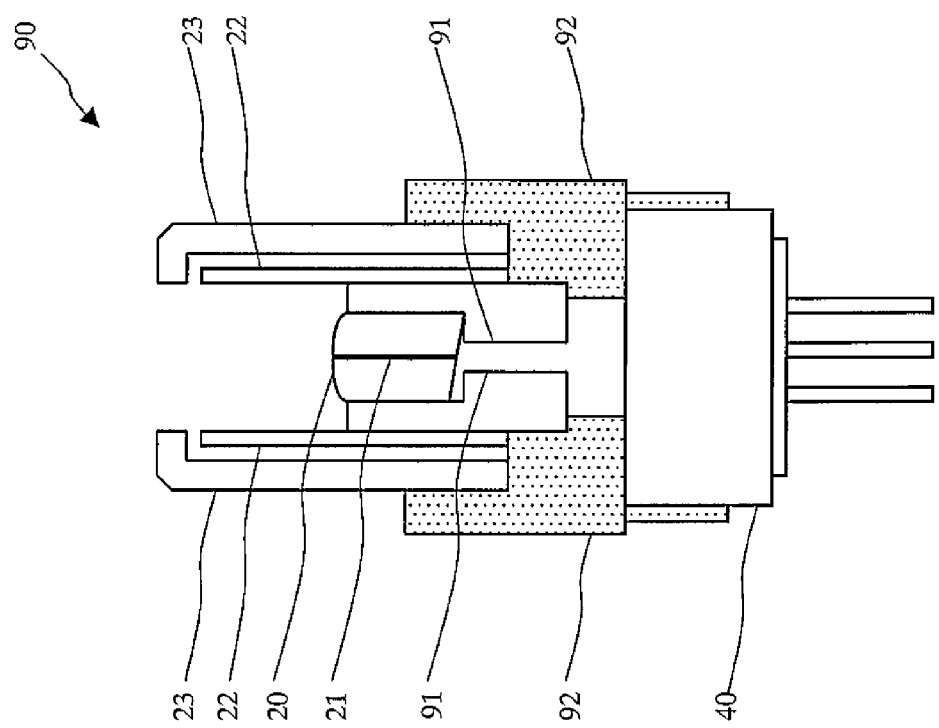
FIG. 4 is a sectional view of a conventional optical module with optical receptacle.

In the optical module with optical receptacle 90 in FIG. 4, in order to hold the outer periphery of the optical module 40 with the holder 92, the holder 92 need to be larger than the holder 92. Therefore, the optical module with optical receptacle 90 increases in size.

On the other hand, in the optical modules with optical receptacle 30 shown in FIGS. 2 and 3, in order to arrange the optical module 40 through the space 24 held between the stub ferrule 20 and the housing 23, the case 42 of the optical module 40 need not be increased in size. As shown in FIGS. 2 and 3, in the optical module with optical receptacle 30, the case 42 can be made smaller than the outer shape of the optical receptacle 10. Therefore, the optical module with optical receptacle 30 can reduce the case 42 of the optical module 40 in size.

In the optical module with optical receptacle 30 in FIG. 3, the end face of the stub ferrule 20 on the space 24 side can be obliquely ground. At this time, feedback light reflected by the end face of the stub ferrule 20 on the space 24 side is not incident on the photodiode 43, and the photodiode 43 can keep a stable operation. Even a light emitting device can similarly keep a stable operation.

Therefore, the second embodiment of the present application can provide an optical module with optical receptacle which has a small connection loss and which can reduced in size.

Since the optical module with optical receptacle 30 includes the photodiode 43, the optical module with optical receptacle 30 may be mounted as a receiving small-size optical device. The optical module with optical receptacle 30 may include a light emitting diode and may be mounted as a transmitting small-size optical device. The optical module with optical receptacle 30 may include a light receiving device and a light emitting device and may be mounted as an optical transceiver.

In the second embodiment of the present application, a gap is preferably formed between the inner peripheral surface of the optical receptacle holding sleeve and the outer peripheral surface of the stub ferrule.

In FIG. 2 or 3, a gap of 0.05 mm is formed between the inner peripheral surface of the optical receptacle holding sleeve 41 and the outer peripheral surface of the stub ferrule 20. The gap of the optical receptacle holding sleeve 41 and the stub ferrule 20 is not limited to the gap described above.

When there is no gap between the inner peripheral surface of the optical receptacle holding sleeve 41 and the outer peripheral surface of the stub ferrule 20, the optical receptacle holding sleeve 41 is sandwiched between the stub ferrule 20 and the housing 23. At this time, the optical module with optical receptacle 30 cannot be positionally adjusted in the optical-axis direction.

A gap is formed between the inner peripheral surface of the optical receptacle holding sleeve 41 and the outer peripheral surface of the stub ferrule 20 such that the optical receptacle holding sleeve 41 is not sandwiched between the stub ferrule 20 and the housing 23. Therefore, the optical receptacle 10 and the optical module 40 can be easily attached to or detached from each other. The optical module with optical receptacle 30 can be easily positionally adjusted in the optical-axis direction of the optical fiber 21.

Therefore, the second embodiment of the present application can provide an optical module with optical receptacle which has a small connection loss and is reduced in size. In addition, the embodiment of the present application can provide an optical module with optical receptacle which can easily adjust an optical axis.

The optical receptacle and the optical module with optical receptacle according to the present invention can be used as a receiving small-size optical device, a transmitting small-size optical device, and a single-conductor bidirectional optical module.

What is claimed is:

1. An optical receptacle comprising:
a columnar stub ferrule having an optical fiber inserted into a center line connecting both opposite end faces;
a cylindrical sleeve into which a part of the stub ferrule is inserted; and
a housing in which a through hole is formed, which houses the stub ferrule and the sleeve in the through hole, which holds a part on a side on which the stub ferrule is not inserted into the sleeve, with a projecting portion formed in the through hole, and which surrounds a side surface of the stub ferrule on the side on which the stub ferrule is not inserted into the sleeve,
wherein the optical receptacle has a space for matching a cylindrical optical receptacle holding sleeve, between the side surface of the stub ferrule on the side on which the stub ferrule is not inserted into the sleeve and an inner peripheral surface of the housing opposing the side surface.

2. An optical module with optical receptacle comprising:
an optical receptacle having a columnar stub ferrule having an optical fiber inserted into a center line connecting both opposite end faces, a cylindrical sleeve into which a part of the stub ferrule is inserted, and a housing in which a through hole is formed, which houses the stub ferrule and the sleeve in the through hole, which holds a part on a side on which the stub ferrule is not inserted into the sleeve, with a projecting portion formed in the through hole, and which surrounds a side surface of the stub ferrule on the side on which the stub ferrule is not inserted into the sleeve, and having a space between the side surface of the stub ferrule on the side on which the stub ferrule is not inserted into the sleeve and an inner peripheral surface of the housing opposing the side surface;
a cylindrical optical receptacle holding sleeve matched to the space of the housing and fitted on the inner peripheral surface of the housing; and
an optical module on which the optical receptacle holding sleeve is arranged and which has a case having an opening formed on an optical axis of the optical fiber and an optical semiconductor device housed in the case so as to form an optical path between the optical semiconductor device and the optical fiber.

3. The optical module with optical receptacle according to claim 2,
wherein a gap is formed between the inner peripheral surface of the optical receptacle holding sleeve and an outer peripheral surface of the stub ferrule.

* * * * *